US012081062B2

(12) United States Patent
Bolton (10) Patent No.: US 12,081,062 B2
(45) Date of Patent: Sep. 3, 2024

(54) POWER SYSTEM FOR A VEHICLE (71) Applicant: Oshkosh Corporation, Oshkosh, WI (US)

(72) Inventor: Mike J. Bolton, Oshkosh, WI (US)

(73) Assignee: Oshkosh Corporation, Oshkosh, WI (US)

( * ) Notice: Subject to any disclaimer, the term of this patent is extended or adjusted under 35 U.S.C. 154(b) by 791 days.

(21) Appl. No.: 17/091,688

(22) Filed: Nov. 6, 2020

(65) Prior Publication Data
US 2021/0143663 A1 May 13, 2021

Related U.S. Application Data (60) Provisional application No. 62/932,859, filed on Nov. 8, 2019.

(51) Int. Cl.
H02J 7/00 (2006.01)
B60L 53/14 (2019.01)
(Continued)

(52) U.S. Cl.
CPC ........ H02J 7/007194 (2020.01); B60L 53/14 (2019.02); B60L 58/18 (2019.02);
(Continued)

(58) Field of Classification Search
CPC ............. H02J 7/007194; H02J 7/00041; H02J 7/0024; H02J 7/0068; B60L 53/14;
(Continued)

(56) References Cited

U.S. PATENT DOCUMENTS 3,958,199 A * 5/1976 Seitz, Jr. ................ H01H 51/28
335/154
6,247,713 B1 6/2001 Konop
(Continued)

FOREIGN PATENT DOCUMENTS

DE 102017222306 A1 * 6/2018 ............... B60K 6/28
JP 2018103741 A * 7/2018 ............... B60K 6/28
(Continued)

OTHER PUBLICATIONS

W. Godsey, "Arc Suppression for Relay Contacts in DC Service," in IRE Transactions on Component Parts, vol. 4, No. 2, pp. 36-42, Jun. 1957. (Year: 1957).*
(Continued)

Primary Examiner — Steve Clemmons
(74) Attorney, Agent, or Firm — Foley & Lardner LLP (57) ABSTRACT A vehicle includes a chassis, tractive elements coupled to the chassis, an electrical system, and a controller. The electrical system includes an electrical load, a first energy storage device coupled to the electrical load, the first energy storage device utilizing a first energy storage technology, and a second energy storage device selectively coupled to the electrical load by a switch, the second energy storage device utilizing a second energy storage technology different from the first energy storage technology. The controller is coupled to the switch and configured to command the switch to disconnect the second energy storage device from the electrical load in response to an indication of a power draw from the electrical load.

19 Claims, 7 Drawing Sheets (51) Int. Cl.
*B60L 58/18* (2019.01)
*B60R 16/03* (2006.01)
*F02N 11/08* (2006.01)
*H01M 10/0525* (2010.01)

(52) U.S. Cl.
CPC .......... *B60R 16/03* (2013.01); *F02N 11/0862* (2013.01); *H01M 10/0525* (2013.01); *H02J 7/00041* (2020.01); *H02J 7/0024* (2013.01); *H02J 7/0068* (2013.01); *B60L 2200/36* (2013.01); *B60L 2240/429* (2013.01); *B60L 2240/545* (2013.01)

(58) Field of Classification Search
CPC ................. B60L 58/18; B60L 2200/36; B60L 2240/429; B60L 2240/545; F02N 11/0862; F02N 11/04; F02N 11/0866
See application file for complete search history.

(56) References Cited

U.S. PATENT DOCUMENTS

| | | | |
|---|---|---|---|
| 6,478,317 B2 | 11/2002 | Konop | |
| 7,111,858 B2 | 9/2006 | Manser et al. | |
| 7,140,461 B2 | 11/2006 | Morrow | |
| 7,198,130 B2 | 4/2007 | Schimke | |
| 7,226,080 B2 | 6/2007 | Humphries | |
| 7,270,346 B2 | 9/2007 | Rowe et al. | |
| 7,357,203 B2 | 4/2008 | Morrow et al. | |
| 7,419,021 B2 | 9/2008 | Morrow et al. | |
| 7,439,711 B2 | 10/2008 | Bolton | |
| 7,448,460 B2 | 11/2008 | Morrow et al. | |
| 7,489,110 B2 * | 2/2009 | Stanesti ................. | H02J 7/0018 320/135 |
| 7,520,354 B2 | 4/2009 | Morrow et al. | |
| 7,605,494 B2 | 10/2009 | Jabaji et al. | |
| 7,931,103 B2 | 4/2011 | Morrow et al. | |
| 8,295,950 B1 | 10/2012 | Wordsworth et al. | |
| 8,561,735 B2 | 10/2013 | Morrow et al. | |
| 8,638,539 B2 * | 1/2014 | Betancourt ............ | H01H 47/32 361/166 |
| 8,749,193 B1 | 6/2014 | Sullivan | |
| 9,276,416 B2 * | 3/2016 | Kroenke ............... | B60L 3/0046 |
| 9,388,785 B2 * | 7/2016 | Sink ......................... | H02J 7/34 |
| 9,579,969 B2 | 2/2017 | Crist et al. | |
| 9,694,671 B2 | 7/2017 | Wildgrube et al. | |
| 9,694,776 B2 | 7/2017 | Nelson et al. | |
| 9,731,594 B2 | 8/2017 | Wildgrube | |
| 9,825,273 B2 * | 11/2017 | Dulle .................. | H01M 50/583 |
| 10,035,648 B2 | 7/2018 | Haddick et al. | |
| 10,053,035 B1 | 8/2018 | Dixon et al. | |
| 10,062,892 B2 * | 8/2018 | Wyatt ..................... | B60L 58/20 |
| 10,099,622 B2 | 10/2018 | Handschke et al. | |
| 10,106,032 B2 | 10/2018 | Crist et al. | |
| 10,300,871 B2 | 5/2019 | Dixon et al. | |
| 10,414,266 B1 | 9/2019 | Wiegand et al. | |
| 10,434,949 B2 | 10/2019 | Handschke et al. | |
| 10,456,610 B1 | 10/2019 | Betz et al. | |
| 10,513,392 B2 | 12/2019 | Haddick et al. | |
| 10,556,622 B1 | 2/2020 | Calliari et al. | |
| 10,618,405 B2 | 4/2020 | Crist et al. | |
| 10,618,481 B2 | 4/2020 | Dixon et al. | |
| 10,913,346 B2 | 2/2021 | Wiegand et al. | |
| 10,981,467 B2 * | 4/2021 | Kinoshita ............. | H02J 7/1423 |
| 11,133,537 B2 * | 9/2021 | King ................... | H02J 7/00034 |
| 11,190,026 B2 * | 11/2021 | Le ......................... | H02J 7/1423 |
| 11,482,869 B2 * | 10/2022 | Nakao ................. | H01M 10/425 |
| 2010/0204860 A1* | 8/2010 | Mitsutani ............. | B60W 10/24 701/22 |
| 2014/0035513 A1* | 2/2014 | Kroenke ............... | H02J 7/0049 320/152 |
| 2019/0185077 A1 | 6/2019 | Smith et al. | |
| 2019/0292975 A1 | 9/2019 | Hou et al. | |
| 2020/0038700 A1 | 2/2020 | Betz et al. | |
| 2020/0087063 A1 | 3/2020 | Haddick et al. | |
| 2020/0231035 A1 | 7/2020 | Crist et al. | |
| 2020/0316816 A1 | 10/2020 | Messina et al. | |
| 2020/0317083 A1 | 10/2020 | Messina et al. | |
| 2020/0346547 A1 | 11/2020 | Rocholl et al. | |
| 2020/0398670 A1 | 12/2020 | Rocholl et al. | |
| 2020/0398695 A1 | 12/2020 | Rocholl et al. | |
| 2021/0031649 A1 | 2/2021 | Messina et al. | |

FOREIGN PATENT DOCUMENTS

| | | | | |
|---|---|---|---|---|
| WO | WO-2011119161 A1 * | 9/2011 | .......... | B60L 11/1861 |
| WO | WO-2013042244 A1 * | 3/2013 | .......... | B60L 11/1809 |

OTHER PUBLICATIONS

Frontline Communications, DSNG/ENG Nissan NV, trade show promotional flyer, featuring Frontline VIP Power System, product disclosed as of Apr. 6, 2013 at National Association of Broadcasters Show, Las Vegas, Nevada, 1 page.
Frontline Communications, Frontline NV-ENG Product Description, 2013, product disclosed as of Apr. 6, 2013 at National Association of Broadcasters Show, Las Vegas, Nevada, 2 pages.
Frontline Communications, Frontline VIP (TM) Exclusive Power System, product description page, 2015, retrieved from the internet at: http://www.frontlinecomm.com/vehicle.cfm?ProductID=%23%210G1%0A on Oct. 21, 2015, 2 pages.
Frontline Communications, NV-ENG SR Product Description, product disclosed as of Apr. 5, 2014 at National Association of Broadcasters Show, Las Vegas, Nevada, 2 pages.
Frontline Communications, NV-ENG SR Product Description, product disclosed as of Apr. 6, 2013, at National Association of Broadcasters Show, Las Vegas, Nevada, 2 pages.
Frontline Communications, NV-IPVS ENG TVU MLink Product Description, product disclosed as of Apr. 5, 2014 at National Association of Broadcasters Show, Las Vegas, Nevada, 2 pages.
Frontline Communications, Press Release titled, "Frontline Communications' Frontline VIP TM Premium Power System Wins NewBay Media's Product Innovation Award 2014", dated Dec. 29, 2014, Clearwater, FL., 3 pages.
Frontline Communications, Press Release titled, "Frontline Communications Introduces Industry's First Full-Size ENG Vehicle with Inverter-Based UPS Battery System; Delivers Extended and Continuous Power Without a Generator", dated Mar. 27, 2013, Clearwater, FL., 3 pages.
Photograph of Display Booth at 2014 National Association of Broadcasters Show held in Las Vegas, Nevada, Apr. 5-10, 2014; showing Frontline VIP(TM) Vehicle Integrated Power System, and product information board marked "Patent Pending". 2 pages.

* cited by examiner

POWER SYSTEM FOR A VEHICLE

CROSS-REFERENCE TO RELATED PATENT APPLICATIONS

This application claims the benefit of U.S. Provisional Patent Application No. 62/932,859, filed Nov. 8, 2019, which is incorporated herein by reference in its entirety.

BACKGROUND

The present disclosure relates generally to vehicle power systems. More specifically, the present disclosure relates to battery management systems for vehicle power systems.

SUMMARY

At least one embodiment relates to a vehicle including a chassis, tractive elements coupled to the chassis, an electrical system, and a controller. The electrical system includes an electrical load, a first energy storage device coupled to the electrical load, the first energy storage device utilizing a first energy storage technology, and a second energy storage device selectively coupled to the electrical load by a switch, the second energy storage device utilizing a second energy storage technology different from the first energy storage technology. The controller is coupled to the switch and configured to command the switch to disconnect the second energy storage device from the electrical load in response to an indication of a power draw from the electrical load.

Another embodiment relates to a vehicle including a chassis, tractive elements coupled to the chassis, an electrical system, a temperature sensor, and a controller. The electrical system includes a source of electrical energy, a first energy storage device coupled to the source of the electrical energy, the first energy storage device utilizing a first energy storage technology, and a second energy storage device selectively coupled to the source of the electrical energy by a switch, the second energy storage device utilizing a second energy storage technology different from the first energy storage technology. The temperature sensor is configured to measure a temperature associated with the second energy storage device. The controller is coupled to the switch and configured to command the switch to disconnect the second energy storage device from the source of the electrical energy in response to the measured temperature falling below a threshold temperature.

Yet another embodiment relates to a power system for a vehicle including an electromagnetic device configured to receive rotational mechanical energy and generate electrical energy, a charger configured to receive electrical energy from an external power source outside the vehicle, a first battery coupled to the electromagnetic device and the charger such that the electromagnetic device and the charger charge the first battery, a second battery, and a switch selectively coupling the second battery to the electromagnetic device and the charger to charge the second battery. The first battery and the second battery utilize different energy storage technologies.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

DETAILED DESCRIPTION

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

Referring generally to the figures, a power system for a vehicle includes two energy storage assemblies, an alternator, and a battery charger. The first energy storage assembly, the alternator, and the battery charger are coupled to the bus. The second energy storage assembly is selectively coupled to the bus by a power management system. The power management system is configured to disconnect the second energy storage assembly from the bus in response to certain conditions (e.g., based on a load level, based on a battery temperature, etc.).

Figure 1:
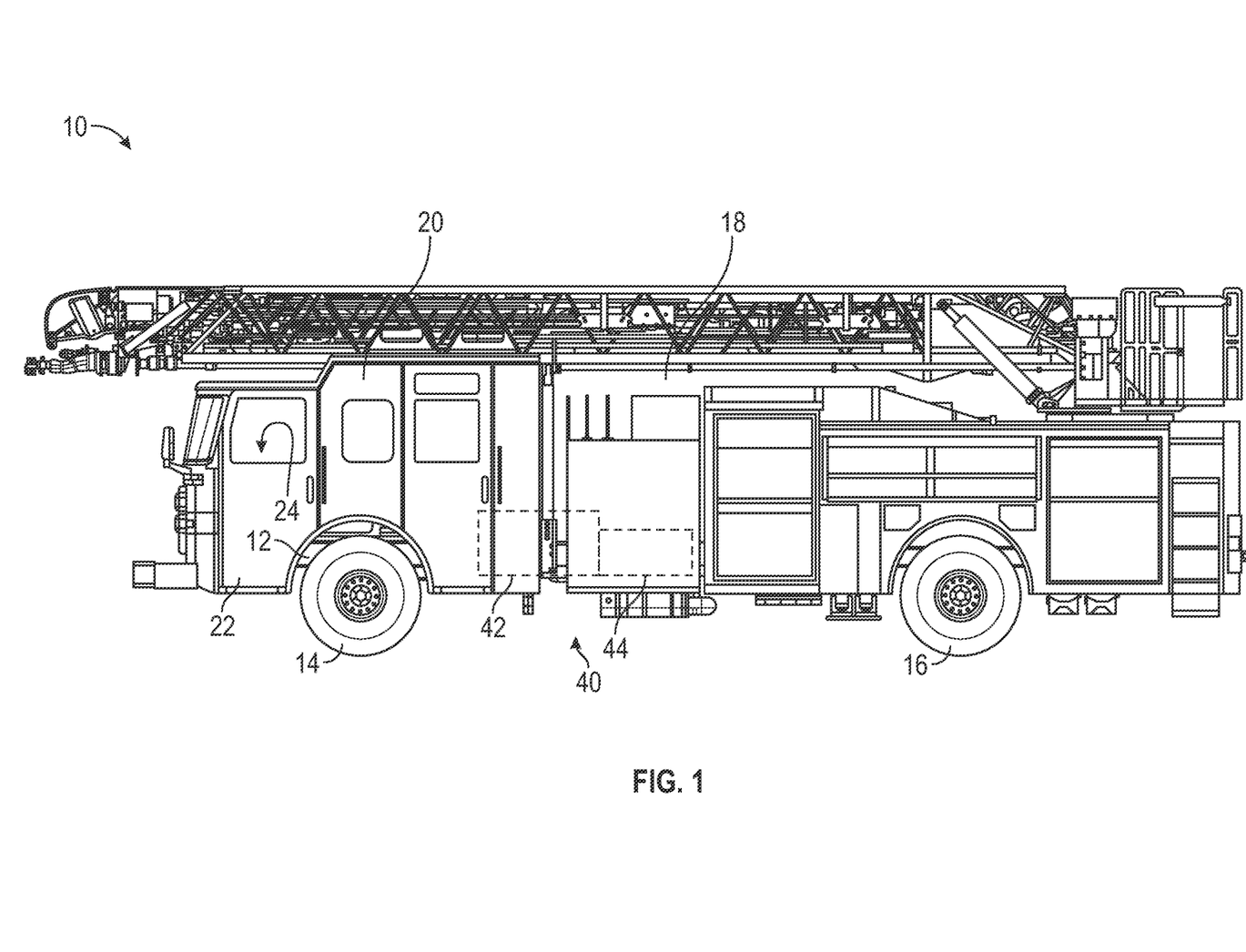
FIG. 1 is a side view of a vehicle, according to an exemplary embodiment.

According to the exemplary embodiment shown in FIG. 1, a vehicle 10 is shown. As shown, the vehicle 10 is a fire fighting vehicle. In other embodiments, the vehicle 10 is a different type of vehicle (e.g., a military vehicle, a refuse vehicle, a concrete mixing truck, a lift device, a mobile news vehicle, a public safety vehicle, a towing vehicle, etc.). As shown in FIG. 1, the vehicle 10 includes a chassis, shown as frame 12. The frame 12 supports a plurality of tractive elements, shown as front wheels 14 and rear wheels 16; a body assembly, shown as a rear section 18; and a cab, shown as front cabin 20. In an alternative embodiment, the tractive elements are otherwise structured (e.g., tracks, etc.). According to an exemplary embodiment, the front cabin 20 includes a plurality of body panels coupled to a support (e.g., a structural frame assembly, etc.). The body panels may define a plurality of openings through which an operator accesses (e.g., for ingress, for egress, to retrieve components from within, etc.) an interior 24 of the front cabin 20. As shown in FIG. 1, the front cabin 20 includes a pair of doors 22 positioned over the plurality of openings defined by the plurality of body panels. The doors 22 may provide access to the interior 24 of the front cabin 20 for a driver (or passengers) of the vehicle 10.

As shown in FIG. 1, the fire fighting vehicle 10 includes a powertrain, shown as powertrain 40. The powertrain 40 of the fire fighting vehicle 10 may include a main driver, shown as engine 42, coupled to a transmission 44. The powertrain 40 may further include one or more clutches, transfer cases, or other devices. The powertrain 40 may be coupled to a drivetrain (e.g., a drive shaft, a differential, an axle, etc. via the transmission 44, etc.) and/or one or more power takeoff devices (e.g., water pumps, hydraulic fluid pumps, etc.). According to an exemplary embodiment, the powertrain 40 (e.g., the engine 42, the transmission 44, clutches, transfer cases, etc. thereof) is coupled to and supported by the frame 12. According to an exemplary embodiment, the engine 42 receives fuel (e.g., gasoline, diesel, etc.) from a fuel tank and combusts the fuel to generate mechanical energy. The transmission 44 receives the mechanical energy and provides an output to a drive shaft and/or the pump transfer case. The rotating drive shaft is received by a differential, which conveys the rotational energy of the drive shaft to a final drive or tractive element, such as the front wheels 14 and/or the rear wheels 16. The front wheels 14 and/or the rear wheels 16 then propel or move the vehicle 10. The powertrain 40 may be configured to drive the front wheels 14, the rear wheels 16, or a combination thereof (e.g., front-wheel-drive, rear-wheel-drive, all-wheel-drive, etc.).

Figure 2:
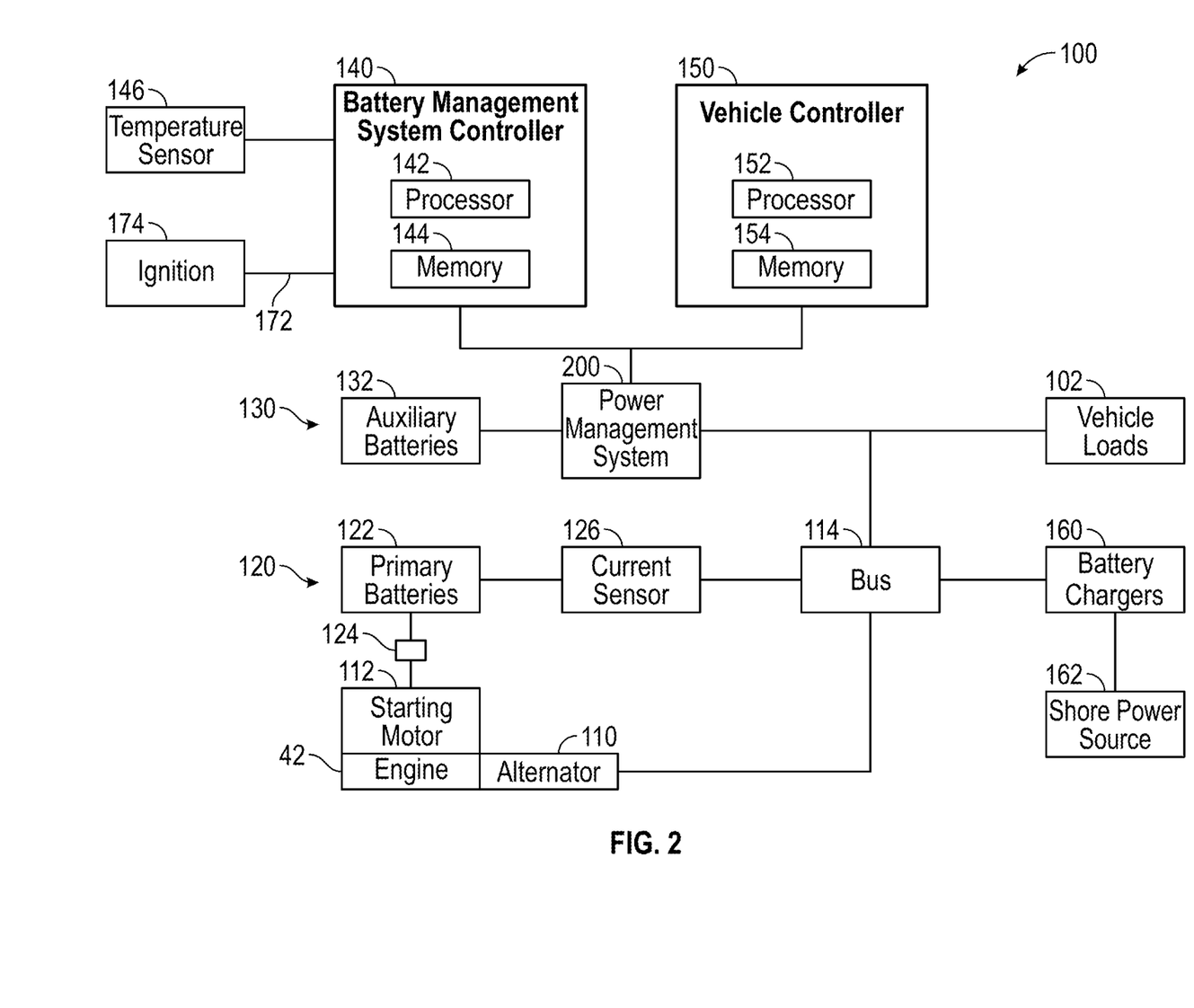
FIG. 2 is a block diagram of a power system of a vehicle, according to an exemplary embodiment.
Figure 3A:
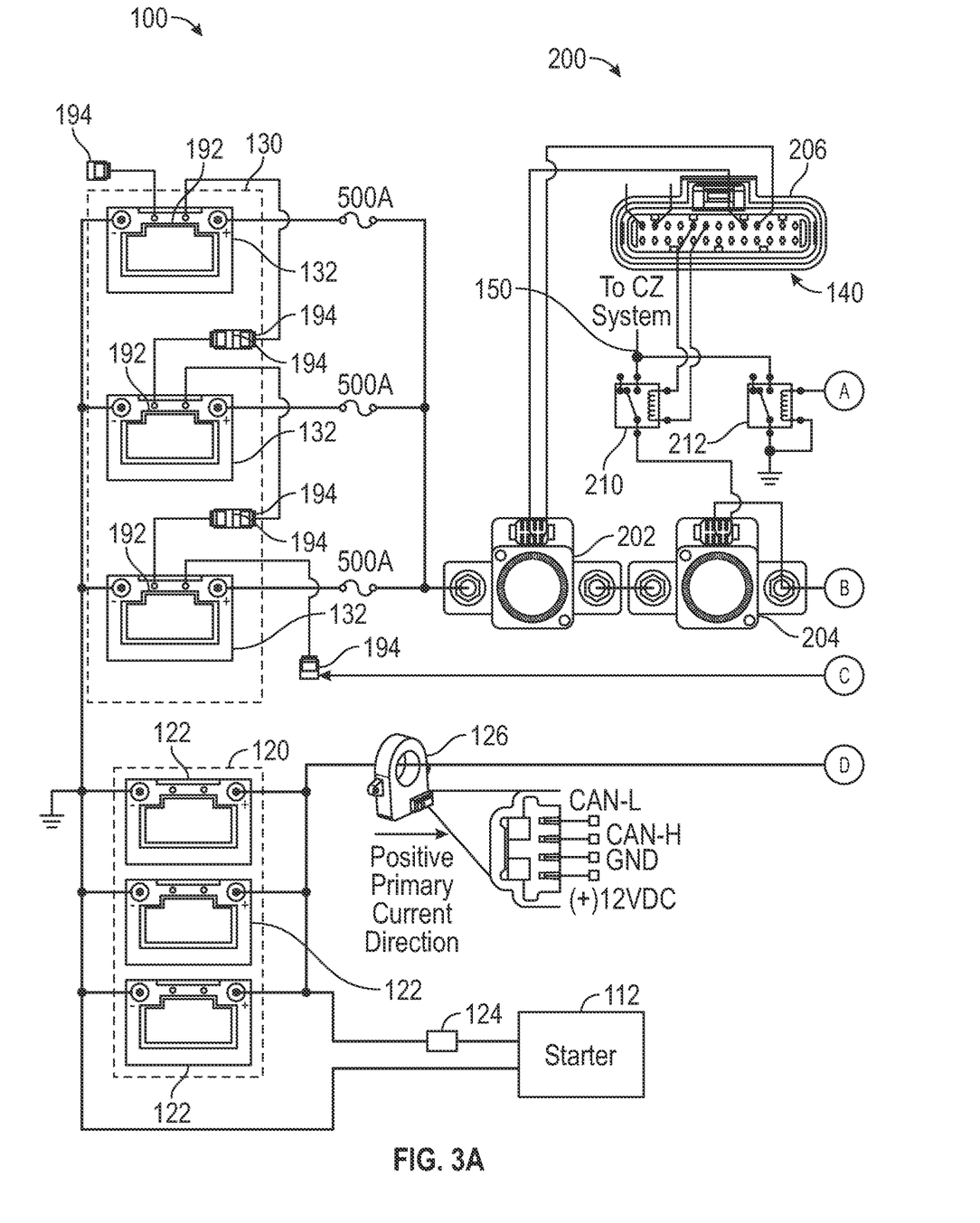
FIGS. 3A and 3B are an electrical schematic of a power system of a vehicle, according to an exemplary embodiment.
Figure 3B:
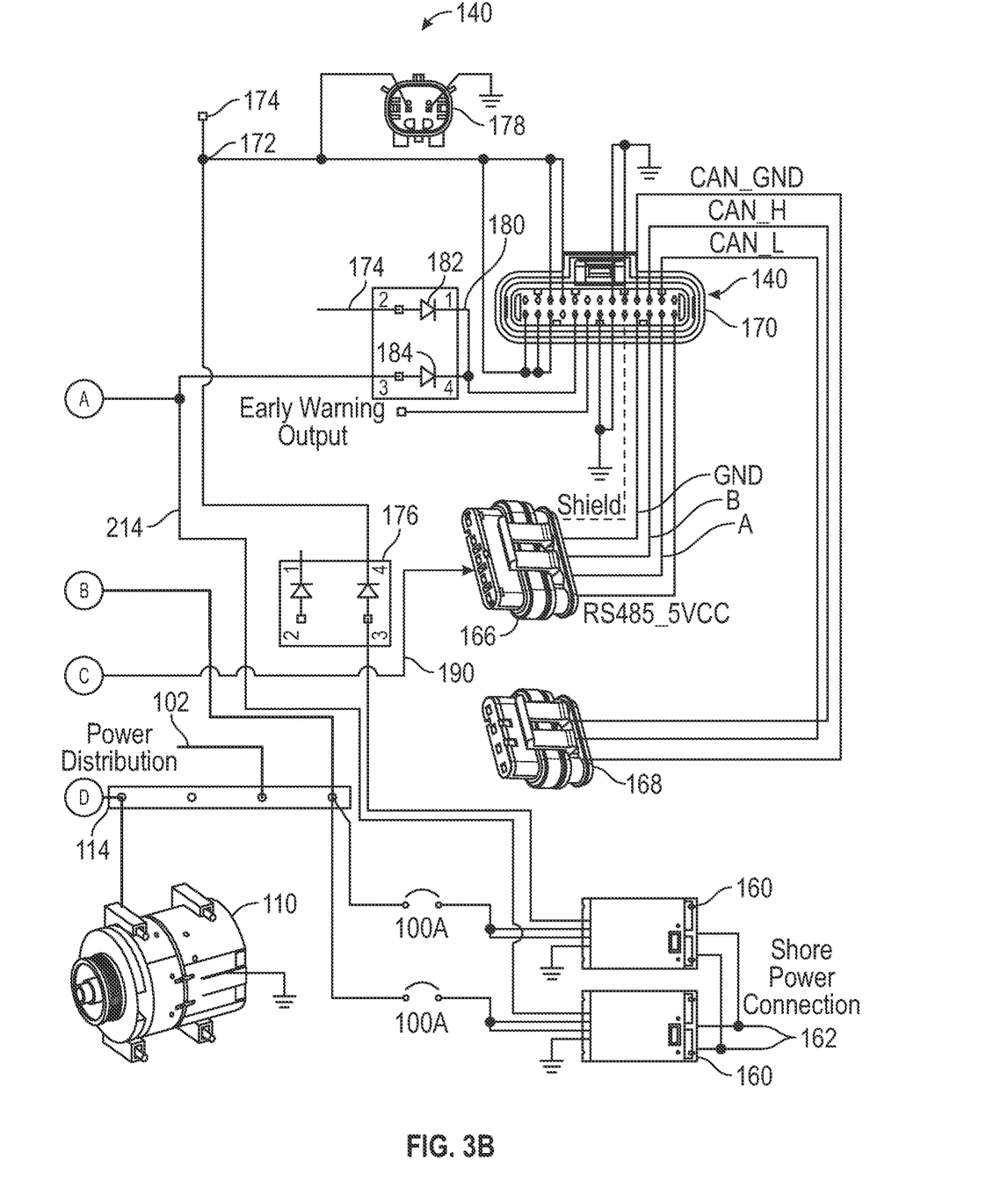

Referring to FIGS. 2, 3A, and 3B, an electrical system of the vehicle 10 is shown as power system 100 according to an exemplary embodiment. The power system 100 is configured to generate and/or receive electrical energy (e.g., alternating current (AC) electrical energy, direct current (DC) electrical energy) and provide the electrical energy to one or more loads, shown as vehicle loads 102. The vehicle loads 102 may include any type of device configured to consume electrical energy. The vehicle loads 102 may include actuators, such as electric motors or solenoids. Such actuators may drive pumps (e.g., water pumps, hydraulic fluid pumps, etc.), move one or more devices (e.g., windshield wipers, a turntable of a fire apparatus, etc.), or otherwise perform one or more tasks. The vehicle loads 102 may include lights (e.g., headlights, interior lights, spotlights, indicators, display, etc.). The vehicle loads 102 may include speakers (e.g., radios, sirens, etc.). The vehicle loads 102 may include control system devices (e.g., controllers, user interface devices, sensors, etc.). The vehicle loads 102 may include heating and/or cooling devices (e.g., a resistive heater, a motor driving a refrigeration circuit, etc.). In other embodiments, the vehicle loads 102 include other types of devices.

As shown in FIGS. 2, 3A, and 3B, the power system 100 includes a power source, energy source, power generation device, or electromagnetic device (e.g., an electric motor and/or generator), shown as alternator 110. The alternator 110 is coupled to the engine 42 such that the alternator 110 receives a rotational mechanical energy input from the engine 42 (e.g., through a serpentine belt arrangement). In response to receiving the rotational mechanical energy input, the alternator 110 is configured to generate electrical energy (e.g., DC electrical energy) to provide throughout the power system 100.

The power system 100 further includes a starter (e.g., an electric motor, an electromagnetic device, etc.), shown as starting motor 112, coupled to the engine 42. The starting motor 112 is configured to consume electrical energy (e.g., DC electrical energy) and provide a rotational mechanical energy output to the engine 42. This rotational mechanical energy is configured to rotate a component of the engine 42 (e.g., a crankshaft) to start the engine 42.

The alternator 110 and the vehicle loads 102 are electrically coupled to a power distribution device or busbar, shown as bus 114. The bus 114 is configured to distribute electrical energy throughout the power system 100. The bus 114 may receive electrical energy from one or more sources and provide the electrical energy to one or more loads of the power system 100. In some embodiments, the power system 100 includes another power distribution device coupled to each of the devices. By way of example, the devices of the power system 100 may be electrically coupled to a common ground, such as the frame 12. In such an example, the bus 114 may have a higher voltage than the common ground. One or more devices may change between a source of electrical energy and a load throughout operation. By way of example, a battery may discharge electrical energy to the bus 114 in certain situations (e.g., when a voltage of the battery is higher than a voltage at the bus 114) and receive electrical energy from the bus 114 in other situations (e.g., when a voltage of the battery is lower than a voltage at the bus 114). By way of another example, an electric motor may consume electrical energy from the bus 114 when providing rotational mechanical energy and provide electrical energy to the bus 114 when receiving rotational mechanical energy. As shown in FIGS. 3A and 3B, the bus 114 is a bus bar. The bus bar may be coupled to other devices within the power system 100 through one or more wires.

The power system 100 further includes a first energy storage assembly or energy storage device, shown as energy storage assembly 120, configured to store energy (e.g., as chemical potential energy, as electric potential energy, etc.). The energy storage assembly 120 utilizes a first energy storage technology (e.g., batteries of a certain battery composition, capacitors, supercapacitors, kinetic energy storage devices (e.g., flywheels, etc.), or other energy storage technologies). As shown in FIGS. 3A and 3B, the energy storage assembly 120 includes three energy storage devices, shown as primary batteries 122. In some embodiments, each of the primary batteries 122 utilize a first battery composition (e.g., lead acid, nickel cadmium, lithium ion, etc.). In one embodiment, the primary batteries 122 are lead-acid batteries. In other embodiments, the energy storage assembly 120 includes more or fewer primary batteries 122.

As shown in FIGS. 3A and 3B, each of the primary batteries 122 arranged in parallel. In other embodiments, the primary batteries 122 are in a different arrangement. By way of example, the primary batteries 122 may be arranged in series. By way of another example, the primary batteries 122 may be arranged with multiple groups of primary batteries 122 in series, where all of the groups are connected in parallel.

As shown in FIG. 2, the energy storage assembly 120 is at least selectively electrically coupled to the starting motor 112. Specifically, the primary batteries 122 are coupled to the starting motor 112 in parallel. The energy storage assembly 120 may selectively supply electrical energy to the starting motor 112 to start the engine 42. As shown, a selective electrical coupler (e.g., a switch, a relay, a contactor, etc.), shown as switch 124, is configured to selectively directly couple the energy storage assembly 120 to the starting motor 112 to start the engine 42. In response to an indication that the engine 42 has started, the switch 124 may decouple the energy storage assembly 120 from the starting motor 112 to cease operation of the starting motor 112.

Referring to FIGS. 2, 3A, and 3B, the energy storage assembly 120 is directly electrically coupled to the bus 114. The energy storage assembly 120 may receive electrical energy from the bus 114 (e.g., when a voltage at the energy storage assembly 120 is less than a voltage at the bus 114), charging the primary batteries 122. The energy storage assembly 120 may supply electrical energy to the bus 114 (e.g., when a voltage at the energy storage assembly 120 is greater than a voltage at the bus 114), draining the primary batteries 122.

A sensor, shown as current sensor 126, is positioned between the energy storage assembly 120 and the bus 114. The current sensor 126 is configured to provide information related to the current flowing between the energy storage assembly 120 and the bus 114 (e.g., a magnitude of the current and/or a direction of the current). In some embodiments, the current sensor 126 measures the current without being directly coupled to the energy storage assembly 120, the bus 114, or a wire extending therebetween. By way of example, the current sensor 126 may be positioned adjacent a wire extending between the energy storage assembly 120 and the bus 114 and may sense a magnetic flux produced by the current passing through the wire.

The power system 100 further includes a second energy storage assembly or energy storage device, shown as energy storage assembly 130, configured to store energy (e.g., as chemical potential energy, as electric potential energy, etc.). The energy storage assembly 130 utilizes a second energy storage technology (e.g., batteries of a certain battery composition, capacitors, supercapacitors, kinetic energy storage devices (e.g., flywheels, etc.), or other energy storage technologies). In some embodiments, the energy storage technology of the energy storage assembly 130 is different than the energy storage technology of the energy storage assembly 130. As shown in FIGS. 3A and 3B, the energy storage assembly 130 includes three energy storage devices, shown as auxiliary batteries 132. In some embodiments, each of the auxiliary batteries 132 utilize a second battery composition (e.g., lead acid, nickel cadmium, lithium ion, etc.). In one embodiment, the auxiliary batteries 132 are lithium ion batteries. In other embodiments, the energy storage assembly 130 includes more or fewer auxiliary batteries 132.

As shown in FIGS. 3A and 3B, each of the auxiliary batteries 132 are arranged in parallel. In other embodiments, the auxiliary batteries 132 are in a different arrangement. By way of example, the auxiliary batteries 132 may be arranged in series. By way of another example, the auxiliary batteries 132 may be arranged with multiple groups of auxiliary batteries 132 in series, where all of the groups are connected in parallel.

Referring to FIGS. 2, 3A, and 3B, the energy storage assembly 130 is selectively electrically coupled to the bus 114 by a circuit, shown as power management system 200. The power management system 200 is configured to electrically couple the energy storage assembly 130 to the bus 114 based on various control logic (e.g., in response to certain inputs or conditions). When coupled to the bus 114, the energy storage assembly 130 may receive electrical energy from the bus 114 (e.g., when a voltage at the energy storage assembly 130 is less than a voltage at the bus 114), charging the auxiliary batteries 132. When coupled to the bus 114, the energy storage assembly 130 may supply electrical energy to the bus 114 (e.g., when a voltage at the energy storage assembly 130 is greater than a voltage at the bus 114), draining the auxiliary batteries 132.

In some embodiments, the energy storage assembly 120 utilizes a first energy storage technology (e.g., lead acid batteries, etc.) that is suited to provide electrical energy at relatively high currents. In some such embodiments, the energy storage assembly 130 utilizes a second energy storage technology (e.g., lithium ion batteries, etc.) that is suited to provide electrical energy at a relatively low current. By way of example, the energy storage assembly 120 may be configured to supply electrical energy at up to a first maximum current, and the energy storage assembly 130 may be configured to supply electrical energy at up to a second maximum current, where the second maximum current is less than the first maximum current. In some embodiments, the energy storage assembly 120 is configured to supply electrical energy at a first, relatively low voltage (e.g., 12.4 V) when charged. In some embodiments, the energy storage assembly 130 is configured to supply electrical energy at a second, relatively high voltage (e.g., 12.8 V) when charged. The first voltage may be lower than the second voltage.

Referring to FIG. 2, the power system 100 includes a first controller or processing circuit, shown as battery management system (BMS) controller 140. The BMS controller 140 includes a processor 142 and a memory device, shown as memory 144. The BMS controller 140 may be configured to monitor and/or control various aspects of the energy storage assembly 120 and/or the energy storage assembly 130. By way of example, the BMS controller 140 may monitor one or more characteristics related to the health of one or more energy storage devices (e.g., impedance, capacity over time, voltage, temperature, operational lifetime, etc.). By way of another example, the BMS controller 140 may monitor one or more characteristics related to the current operating state of one or more energy storage devices (e.g., voltage, current draw, operating temperature, temperature of the operating environment, capacity, etc.).

The BMS controller 140 may be configured to provide one or more commands. The commands may cause one or more systems to perform one or more actions to manage a status of an energy storage device. By way of example, the BMS controller 140 may be configured to cause one or more actions that prolong the lifetime of the energy storage device. By way of example, the BMS controller 140 may stop an energy storage device from discharging or charging under certain conditions (e.g., when the energy storage device is above or below a threshold capacity, when the energy storage device is above or below a threshold temperature, etc.)

The BMS controller 140 may be coupled to one or more sensors that provide information to the BMS controller 140. As shown in FIG. 2, the BMS controller 140 is operatively coupled to a sensor, shown as temperature sensor 146. The temperature sensor 146 is configured to provide an indication of a current temperature experienced by the energy storage assembly 130. By way of example, the temperature sensor 146 may be directly coupled to the energy storage assembly 130 and measure a temperature of the energy storage assembly 130 directly. By way of another example, the temperature sensor 146 may measure an ambient temperature of the surrounding operating environment.

The power system 100 further includes a second controller or processing circuit, shown as vehicle controller 150. The vehicle controller 150 includes a processor 152 and a memory device, shown as memory 154. The vehicle controller 150 may be configured to monitor and/or control various aspects of the vehicle 10. By way of example, the vehicle controller 150 may receive information from and/or provide commands to the powertrain 40, HVAC systems, lighting systems, pumping systems, ladder systems, navigation systems, engine control systems, maintenance tracking systems, tire pressure monitoring systems, continuous tire inflation systems, communications systems, autonomous driving systems, or other vehicle systems. The vehicle controller 150 may receive information from sensors (e.g., position sensors, accelerometers, global positioning systems, cellular devices, diagnostic sensors, etc.), user interface devices (e.g., keyboards, touch screens, microphones, etc.), telematics devices, other computing devices (e.g., user devices, servers, etc.), and/or other devices. The vehicle controller 150 may provide information and/or commands to actuators (e.g., pumps, motors, solenoids, switches, etc.), user interface devices (e.g., speakers, screens, haptic feedback devices, etc.), lights, other computing devices, and/or other devices.

Although the BMS controller 140 and the vehicle controller 150 are described as separate devices, in other embodiments, the BMS controller 140 and the vehicle controller 150 are implemented within the same physical device. By way of example, the BMS controller 140 and the vehicle controller 150 may share the same processor and/or memory. Any information provided to one of the controller may additionally or alternatively be provided to the other controller. In some embodiments, one controller incorporates the functionality of both the BMS controller 140 and the vehicle controller 150.

The BMS controller 140 and the vehicle controller 150 are operatively coupled to the power management system 200. By way of example, the BMS controller 140 and/or the vehicle controller 150 may be configured to receive signals (e.g., voltages, currents, sensor signals, commands, etc.) from the power management system 200. By way of another example, the BMS controller 140 and/or the vehicle controller 150 may be configured to provide signals (e.g., voltages, currents, commands, etc.) to the power management system 200. The signals from the BMS controller 140 and/or the vehicle controller 150 may control whether or not the power management system 200 electrically couples the energy storage assembly 130 to the bus 114.

Referring to FIGS. 2, 3A, and 3B, the power system 100 further includes energy sources or charging devices (e.g., inverters, rectifiers, etc.), shown as battery chargers 160, coupled to an external power source or external energy source, shown as shore power source 162. The battery chargers 160 are directly electrically coupled to the bus 114. The battery chargers 160 are configured to receive electrical energy in a first state (e.g., at a specific voltage, at a specific current, AC or DC) and provide electrical energy to the bus 114 in a second state. By way of example, the battery chargers 160 may receive AC electrical energy from the shore power source 162 (e.g., at 120V, etc.) and provide DC electrical energy to the bus 114 (e.g., at 12V, at 14V, etc.). The electrical energy from the battery chargers 160 may power the vehicle loads 102, charge the energy storage assembly 120, and/or charge the energy storage assembly 130. Although FIGS. 3A and 3B show the power system 100 as including two battery chargers 160, it should be understood that the power system 100 may include more or fewer battery chargers 160.

The shore power source 162 may be in a location offboard the vehicle 10 (e.g., in a garage where the vehicle 10 is stored, at a designated refueling location, etc.). By way of example, the shore power source 162 may be an outlet connected to a generator or power grid. To facilitate moving the vehicle 10 independent of the shore power source 162, the battery chargers 160 may be selectively coupled to the shore power source 162. When a user wishes to supply electrical energy from the shore power source 162 to the vehicle 10, the user may couple the battery chargers 160 to the shore power source 162 (e.g., with a charging cable having a connector that interfaces with the shore power source 162). The user may subsequently disconnect the battery chargers 160 from the shore power source 162, permitting the vehicle 10 to move freely away from the shore power source 162.

Referring to FIGS. 3A and 3B, the BMS controller 140 includes an input device (e.g., a sensor input device), shown as input connector 170. The input connector 170 is configured to receive one or more input signals (e.g., voltages, etc.) through the input connector 170. The BMS controller 140 may perform one or more actions based on the input signals. As shown, the input connector 170 is coupled to a first connector, shown as RS485 connector 166, and a second connector, shown as CAN connector 168. The RS485 connector 166 may facilitate communication between the BMS controller 140 and other devices using the RS485 protocol. The CAN connector 168 may facilitate communication between the BMS controller 140 and other devices using the CAN protocol.

Referring to FIGS. 2, 3A, and 3B, a first input node (e.g., a connector, a terminal, one or more pins, etc.), shown as input node 172, is electrically coupled to the input connector 170. The input node 172 is electrically coupled to a user input device, shown as ignition 174. The ignition 174 is configured to be activated by a user when the user wishes to turn the engine 42 on or off. When the ignition 174 is in an "off" state, the ignition 174 may (a) not supply the input node 172 with an input signal (e.g., a voltage) and (b) may stop operation of the engine 42. When the ignition 174 is in an "on" state, the ignition 174 may (a) supply an input signal (e.g., a voltage) to the input node 172 indicating that the ignition 174 is in the "on" state and (b) maintain operation of the engine 42 if the engine 42 is already in operation (i.e., keep the engine 42 running). In one embodiment, the input signal provided by the ignition 174 is 12V DC power. The 12V DC power may be provided by the energy storage assembly 120. While in the "on" state, the ignition 174 may selectively be configured to an "engine start" state, in which the ignition 174 activates the starting motor 112 (e.g., by closing the switch 124) to start operation of the engine 42.

The input node 172 is further electrically coupled to one of the battery chargers 160 (e.g., the top battery charger 160 as shown in FIG. 3). The battery charger 160 is configured to provide an input signal (e.g., a voltage) to the input node 172 when the battery charger 160 is receiving electrical energy from the shore power source 162 and/or providing electrical energy to the bus 114. In one embodiment, the input signal provided by the ignition 174 is 12V DC power. The 12V DC power may be provided by the energy storage assembly 120. The battery charger 160 is coupled to the input node 172 through a diode 176 that is oriented to limit (e.g., prevent) a flow of current from the input node 172 to the charger 160. Accordingly, the input node 172 receives an input signal (e.g., a voltage) (a) when the ignition 174 is in the "on" state, (b) when the battery charger 160 is receiving electrical energy from the shore power source 162, and (c) when both the ignition 174 is in the "on" state and the battery charger 160 is receiving electrical energy from the shore power source 162.

The input node 172 is further connected to a connector, shown as power connector 178, of the BMS controller 140. In some embodiments, the power connector 178 is an ISO connector. The power connector 178 is configured to supply electrical energy to the BMS controller 140 to power the BMS controller 140. The power connector 178 supplies power to operate the BMS controller 140 when the input signal is received. In some embodiments, the BMS controller 140 is powered off when both (a) the ignition 174 is in the "off" state and (b) the battery charger 160 is not receiving electrical energy from the shore power source 162.

Referring to FIGS. 3A and 3B, a second input node (e.g., a connector, a terminal, one or more pins, etc.), shown as input node 180, is electrically coupled to the input connector 170. The input node 180 is configured to receive an input signal (e.g., a voltage) through a diode 182 when the ignition 174 is in the "engine start" state. In one embodiment, the input node 180 is electrically coupled to the ignition 174 through the diode 182. The input node 180 is further electrically coupled to one of the battery chargers 160 (e.g., the bottom battery charger 160 as shown in FIG. 3). The battery charger 160 is configured to provide an input signal (e.g., a voltage) to the input node 180 when the battery charger 160 is receiving electrical energy from the shore power source 162 and/or providing electrical energy to the bus 114. The battery charger 160 is coupled to the input node 180 through a diode 184 that is oriented to limit (e.g., prevent) a flow of current from the input node 180 to the charger 160.

Referring to FIGS. 3A and 3B, a fourth input node (e.g., a connector, a terminal, one or more pins, etc.), shown as input node 190, is electrically coupled to the input connector 170. The input node 190 is electrically coupled to each of the auxiliary batteries 132. Specifically, the input node 190 is coupled to a sensor 192 (e.g., a voltage sensor, an impedance sensor, etc.) of each auxiliary battery 132. As shown, each of the sensors 192 are connected to the input node 190 in series, with resistors 194 (e.g., 120 ohm resistors) on opposite sides of each auxiliary battery 132. The sensors 192 are configured to provide an input signal (e.g., a voltage, a resistance, etc.) to the input node 190 indicative of a status of the corresponding auxiliary battery 132. The status may include a voltage, an impedance, and/or another type of status.

Referring to FIGS. 3A and 3B, the power management system 200 is shown according to an exemplary embodiment. The power management system 200 includes two electrical switching devices or switches (e.g., mechanical switches, relays, contactors, etc.), shown as contactor 202 and contactor 204. The contactor 202 and the contactor 204 are arranged in series between the energy storage assembly 130 and the bus 114. When both the contactor 202 and the contactor 204 are closed, the contactor 202 and the contactor 204 electrically couple the energy storage assembly 130 to the bus 114. When one or both of the contactor 202 or the contactor 204 (i.e., the contactor 202 alone, the contactor 204 alone, or both the contactor 202 and the contactor 204) are open, the energy storage assembly 130 is electrically decoupled (i.e., isolated) from the bus 114.

Figure 4:
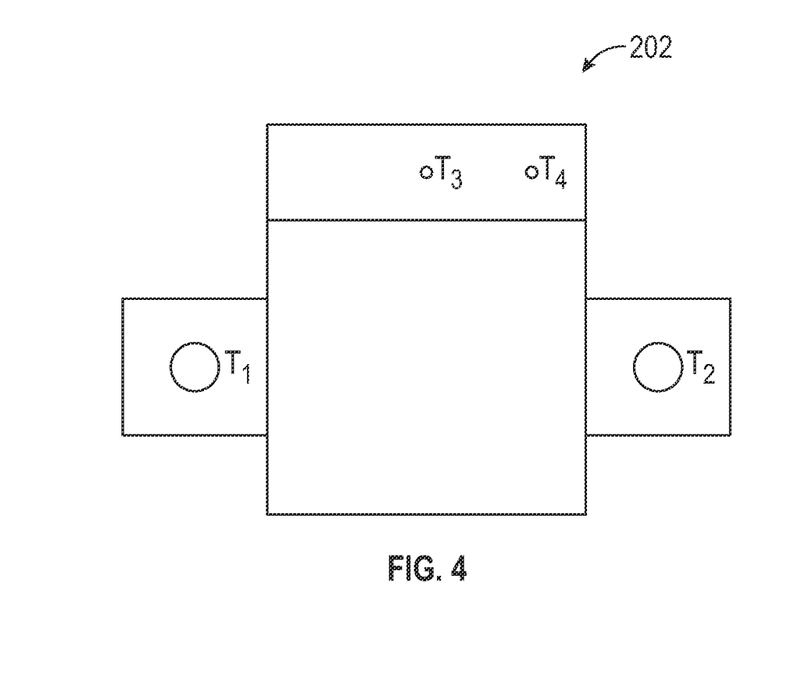
FIG. 4 is a diagram of a contactor of the power system of FIGS. 3A and 3B.

Referring to FIG. 4, the contactor 202 is shown. The contactor 204 has a similar construction to the contactor 202, and thus any description of the contactor 202 with respect to FIG. 4 may also apply to the contactor 204. The contactor 202 includes a plurality of pins, contacts, connectors, or terminals, shown as terminal $T_1$, terminal $T_2$, terminal $T_3$, and terminal $T_4$. The terminal $T_3$ and the terminal $T_4$ are configured to control the connection between the terminal $T_1$ and the terminal $T_2$. Specifically, when a voltage (e.g., greater than a threshold voltage) is received across the terminal $T_3$ and the terminal $T_4$, the contactor 202 is closed and the terminal $T_1$ is electrically coupled to the terminal $T_2$. When below a threshold voltage (e.g., no voltage) is received across the terminal $T_3$ and the terminal $T_4$, the contactor 202 is open and the terminal $T_1$ is electrically decoupled from the terminal Ta. Accordingly, the contactor 202 may be normally open. In some embodiments, the contactor 202 is configured to withstand a higher current passing between the terminal $T_1$ and the terminal $T_2$ than between the terminal $T_3$ and the terminal $T_4$.

Referring to FIGS. 3A and 3B, the terminal $T_2$ of the contactor 204 is directly electrically coupled to the bus 114. The terminal $T_2$ of the contactor 202 is directly electrically coupled to the terminal $T_1$ of the contactor 204. The terminal $T_1$ of the contactor 202 is directly electrically coupled to the energy storage assembly 130. Accordingly, the energy storage assembly 130 is electrically decoupled from the bus 114 unless voltages are applied across the terminal $T_3$ and terminal $T_4$ of both the contactor 202 and the contactor 204.

The terminal $T_3$ and the terminal $T_4$ of the contactor 202 are directly electrically coupled to a connector 206 of the BMS controller 140. The BMS controller 140 controls operation of the contactor 202 by selectively providing a signal to the contactor 202 (e.g., by applying a voltage across the terminal $T_3$ and the terminal $T_4$) through the connector 206. In some embodiments, operation of the contactor 202 is solely dependent on signals from the BMS controller 140 and is independent of the vehicle controller 150.

The terminal $T_3$ of the contactor 204 is electrically coupled to the bus 114. The terminal $T_4$ of the contactor 204 is selectively electrically coupled to a ground (e.g., the frame 12) through a pair of electrical switching devices or switches, shown as relay 210 and relay 212. When the relay 210 and/or the relay 212 couple the terminal $T_3$ of the contactor 204 to a ground, a voltage is applied across the terminal $T_3$ and the terminal $T_4$, closing the contactor 204.

Figure 5:
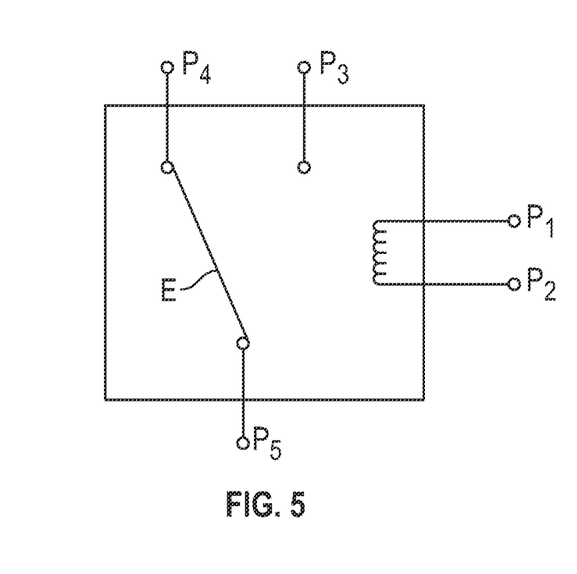
FIG. 5 is a diagram of a relay of the power system of FIGS. 3A and 3B.

Referring to FIG. 5, the relay 210 is shown. In some embodiments, the relay 210 is a five pin relay. The relay 212 has a similar construction to the relay 210, and thus any description of the relay 210 with respect to FIG. 5 may also apply to the relay 212. The relay 210 includes a plurality of pins, contacts, connectors, or terminals, shown as pin $P_1$, pin $P_2$, pin $P_3$, pin $P_4$, and pin $P_5$. The pin $P_1$ and the pin $P_2$ are coupled to opposite ends of an electromagnet coil. A conductive element E is repositionable between (a) a first position (shown in FIG. 5) in which the element E electrically couples the pin $P_4$ to the pin $P_5$ and (b) a second position in which the element E electrically couples the pin $P_3$ to the pin $P_5$. The element E is normally in the first position. When a voltage is applied across the pin $P_1$ and the pin $P_2$, the electromagnet coil causes the element E to move to the second position.

Referring to FIGS. 3A and 3B, the pin $P_1$ and the pin $P_2$ of the relay 210 are directly electrically coupled to the connector 206 of the BMS controller 140. The pin $P_5$ of the relay 210 is electrically coupled to the terminal $T_4$ of the contactor 204. The pin $P_4$ is electrically isolated (i.e., not connected to a ground or voltage source). Accordingly, with the element E of the relay 210 in the normal, open, first position, the terminal $T_4$ of the contactor 204 is not grounded, and the contactor 204 is open. The pin $P_3$ is electrically coupled to the vehicle controller 150 and to the pin $P_3$ of the relay 212. As shown, the relay 210 is wired in a normally open configuration. The BMS controller 140 controls operation of the relay 210 by selectively providing a closing signal to the relay 210 (e.g., by applying a voltage across the pin $P_1$ and the pin $P_2$) through the connector 206. When the BMS controller 140 applies a voltage to the relay 210, the relay 210 is configured to close (i.e., the element E is configured to move to the second position, coupling the pin $P_5$ and the pin $P_3$), coupling the terminal $T_4$ of the contactor 204 to the vehicle controller 150 and the pin $P_3$ of the relay 212. The BMS controller 140 may be configured to supply the closing signal to the relay 210 in response to certain conditions based on logic stored within the memory 144. In some embodiments, operation of the relay 210 is solely dependent on signals from the BMS controller 140 and is independent of the vehicle controller 150.

The pin $P_2$ and the pin $P_5$ of the relay 212 are electrically coupled to a ground (e.g., the frame 12). The pin $P_4$ of the relay 212 is electrically isolated. As shown, the relay 212 may be wired in a normally open configuration. Accordingly, with the element E of the relay 212 in the normal, first, open position, the terminal $T_4$ of the contactor 204 is not grounded through the relay 212. The pin $P_1$ of the relay 212 is electrically coupled to a first one of the battery chargers 160 through a conductor (e.g., a wire) shown as wire 214. The battery charger 160 applies a voltage to the wire 214 when the shore power source 162 is coupled to the battery charger 160 and the battery charger 160 is receiving shore power. Accordingly, the relay 212 is configured to close (i.e., the element E is configured to move to the second position, coupling the pin $P_5$ and the pin $P_3$) in response to a voltage being supplied to the wire 214, which indicates that the battery charger 160 is supplying electrical energy to the bus 114. With both the relay 210 and the relay 212 closed, the terminal $T_4$ of the contactor 204 is grounded through the relay 210 and the relay 212, and the contactor 204 is closed.

Additionally or alternatively, the pin $P_3$ of the relay 210 may be grounded by the vehicle controller 150. The vehicle controller 150 is directly electrically coupled to the pin $P_3$ of the relay 210 (e.g., through one or more wires or connectors, etc.). The vehicle controller 150 is configured to selectively supply a closing signal for the contactor 204 to the pin $P_3$. By way of example, the vehicle controller 150 may selectively electrically couple the pin $P_3$ of the relay 210 to a ground (e.g., the frame 12). The vehicle controller 150 may be configured to supply the closing signal to the pin $P_3$ of the relay 210 in response to certain conditions based on logic stored within the memory 154.

Referring again to FIGS. 3A and 3B, in operation, the contactor 202 and the contactor 204 are normally open, disconnecting the energy storage assembly 130 from the bus 114. The contactor 202 may be selectively closed by the BMS controller 140 (e.g., based on logic of the BMS controller 140). The contactor 204 is controlled by the relay 210, the relay 212, and vehicle controller 150. As shown, the relay 212 and the vehicle controller 150 are arranged in parallel with one another and in series with the relay 210. Accordingly, if the relay 210 is open, the contactor 204 remains open, regardless of the state of the vehicle controller 150 and/or the relay 212. The relay 210 may be selectively closed by the BMS controller 140. With the relay 210 closed, the vehicle controller 150 and/or the relay 212 may supply a closing signal (e.g., a ground connection) to the contactor 204 through the relay 210. The closing signal may be supplied by the vehicle controller 150, the relay 212, or both the vehicle controller 150 and the relay 212. The closing signal may be selectively supplied by the vehicle controller 150 (e.g., based on the logic of the vehicle controller 150). The relay 212 selectively supplies the closing signal when the battery chargers 160 are supplying electrical energy to the bus 114.

According to an exemplary embodiment, the BMS controller 140 can open and close the contactor 202 independent of the operation of vehicle controller 150 and the battery chargers 160. The BMS controller 140 can open the contactor 204 independent of the operation of the vehicle controller 150 and the battery chargers 160. If the BMS controller 140 has closed both the contactor 202 and the relay 210, the contactor 204 may be closed (a) by the vehicle controller 150 and/or (b) by the relay 212 in response to an indication that the battery chargers 160 are receiving electrical energy from the shore power source 162. With both the contactor 202 and the contactor 204 closed, the energy storage assembly 130 is electrically coupled to the bus 114 and any associated charging and/or loads.

In some embodiments, the BMS controller 140 is configured to control the contactor 202 based on logic stored within the memory 144. The BMS controller 140 may normally close the contactor 202 in response to receiving an indication that the ignition 174 is in the "on" state and/or that the battery charger 160 is receiving electrical energy from the shore power source 162. This indication may be an input signal to the input node 172 from the battery charger 160 and/or the ignition 174. The BMS controller 140 may open the contactor 202 in response to an indication that the energy storage assembly 130 requires protection. By way of example, the indication may be an input signal received at the input node 190 from the sensors 192 indicating that the status of one or more auxiliary batteries 132 is outside of a normal operating condition (e.g., a voltage is outside of a normal operating range, etc.). By way of another example, the indication may be an input signal indicating an activation or a power draw of an electrical load. In one such example, the indication may be an input signal (e.g., from the current sensor 126) indicating that a load on the power system 100 is above a threshold load (e.g., a current draw is above a threshold current draw). By way of another example, the indication may be an input signal from the temperature sensor 146 indicating that a temperature experienced by one or more of the auxiliary batteries 132 is outside of a normal operating range (e.g., is below a threshold temperature, such as 0 degrees Celsius). Such an indication may further be dependent on whether the energy storage assembly 130 is charging or discharging energy (e.g., the indication may be provided only if the temperature falls below the threshold temperature while charging, but may not be provided when discharging).

In some embodiments, the BMS controller 140 is configured to control the contactor 204 based on logic stored within the memory 144. The BMS controller 140 may normally close the relay 210 in response to receiving an indication that the ignition 174 is in the "on" state and/or that the battery charger 160 is receiving electrical energy from the shore power source 162. This indication may be an input signal to the input node 172 from the battery charger 160 and/or the ignition 174. Alternatively, the BMS controller 140 may control the relay 210 regardless of whether or not the battery charger 160 is receiving electrical energy from the shore power source 162. The BMS controller 140 may open the relay 210 in response to an indication that the energy storage assembly 130 requires protection. By opening the relay 210, the BMS controller 140 overrides the vehicle controller 150 and the relay 212, opening the contactor 204.

In some embodiments, the vehicle controller 150 is configured to control the contactor 204 based on logic stored in the memory 154. Specifically, the vehicle controller 150 is configured to selectively supply a closing signal to the contactor 204 through the relay 210 to close the contactor 204. In some embodiments, the vehicle controller 150 is configured to normally supply the closing signal when the vehicle controller 150 is active (e.g., turned on). The vehicle controller 150 may be active when one or both of (a) the ignition 174 is in the "on" state or (b) the battery chargers 160 are receiving electrical energy from the shore power source 162. The vehicle controller 150 may stop supplying the closing signal in response to an indication that the energy storage assembly 130 requires protection.

The BMS controller 140 and/or the vehicle controller 150 may disconnect the energy storage assembly 130 from the bus 114 in response to an indication that a user is attempting to start the engine 42. The indication that the user is attempting to start the engine 42 may include a crank signal from the ignition 174. The ignition 174 may provide the crank signal when in the "engine start" state. The ignition 174 may enter the "engine start" state in response to a The vehicle controller 150 may open the contactor 204 by not supplying the closing signal. Additionally or alternatively, the BMS controller 140 may disconnect the contactor 202 directly and/or the relay 212.

In some embodiments, the vehicle controller 150 is deactivated (e.g., turned off) when the ignition 174 is in the "off" state. The relay 212 is configured to be closed when the battery chargers 160 are receiving electrical energy from the shore power source 162, regardless of the state of the ignition 174. Accordingly, when the ignition is in the "off" state but the battery chargers 160 are receiving electrical energy and the relay 210 is closed, the relay 212 still closes the contactor 204.

In some embodiments, when the energy storage assembly 130 is coupled to the bus 14, the energy storage assembly 130 generally provides more electrical energy to power the loads on the bus 114 than the energy storage assembly 120. This is selectively interrupted by the contactor 202 and/or the contactor 204, such that the energy storage assembly 120 may then become the primary provider of electrical energy within the vehicle 10. This arrangement may facilitate powering lower current loads with the energy storage assembly 130 while maintaining a high state of charge on the energy storage assembly 120. By way of example, maintaining a higher voltage in the energy storage assembly 130 than in the energy storage assembly 120 may facilitate this (e.g., the energy is drawn from the source with the higher potential first). In the event that a high current load is experienced, the energy storage assembly 130 may be disconnected, permitting the energy storage assembly 120 to power the high current load.

Figure 6A:
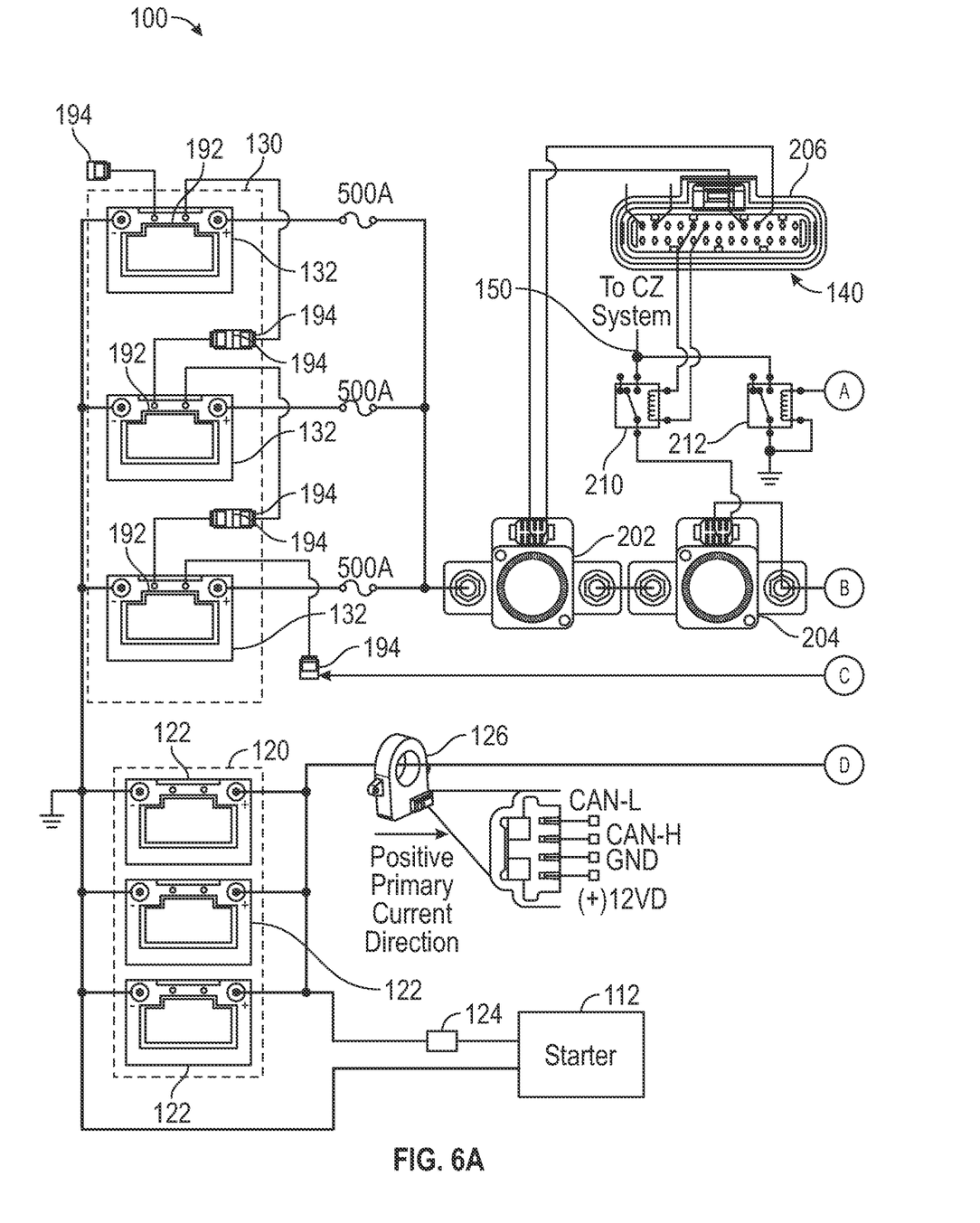
FIGS. 6A and 6B are an electrical schematic of a power system of a vehicle, according to another exemplary embodiment.
Figure 6B:
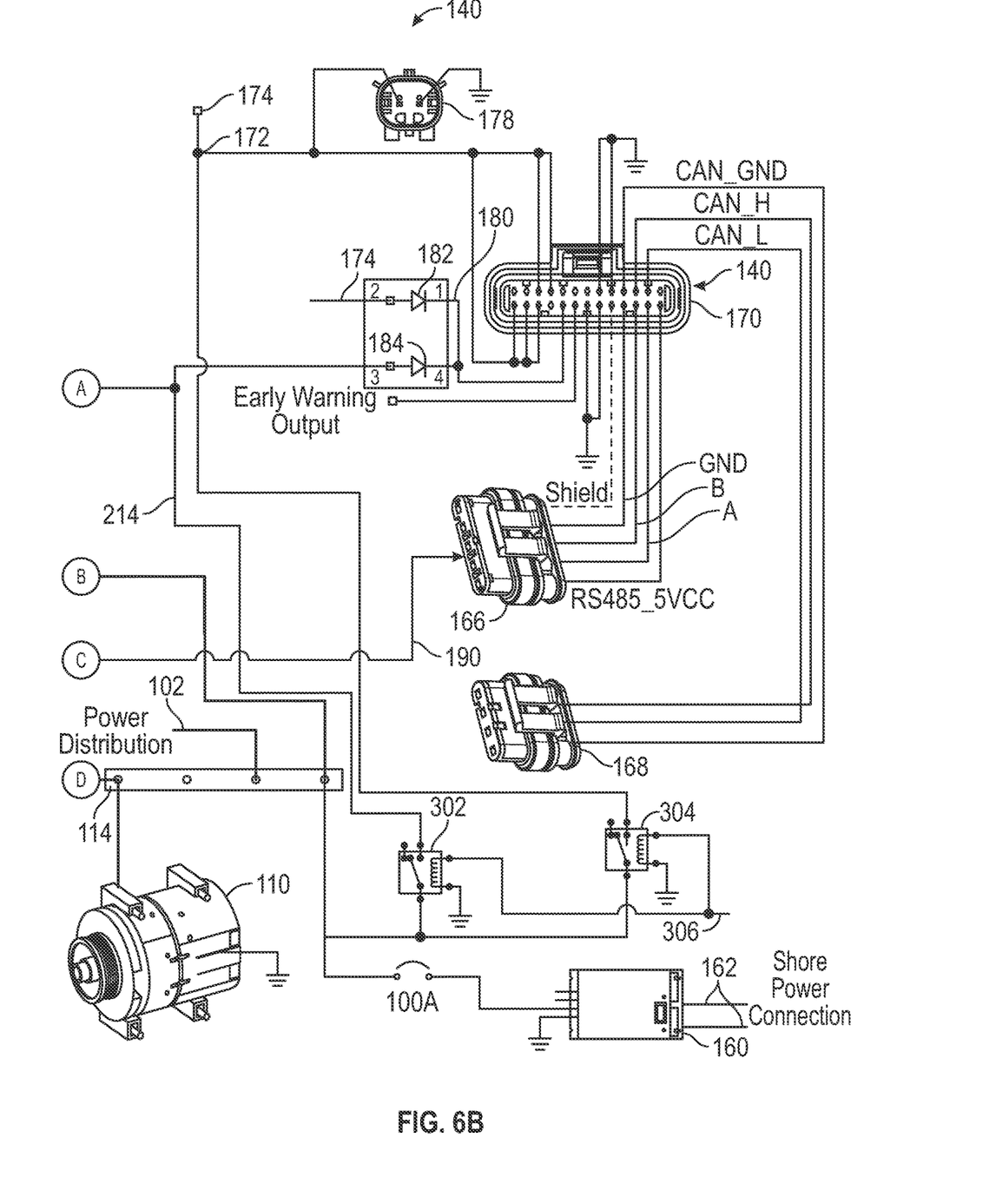

Referring to FIGS. 6A and 6B, the power system 100 is shown as an alternative embodiment of the power system 100 of FIGS. 3A and 3B. The power system 100 of FIGS. 6A and 6B may be substantially similar to the power system 100 of FIGS. 3A and 3B except as otherwise specified herein. One of the battery chargers 160 is omitted from the power system 100 of FIGS. 6A and 6B. A first switching device, shown as relay 302, selectively electrically couples the bus 114 to the wire 214. A second switching device, shown as relay 304, selectively electrically couples the bus 114 to the input node 172. The relay 302 and the relay 304 are controlled by a power source (e.g., a source of 12V DC power), shown as shore indicator 306. The shore indicator 306 is configured to supply a voltage across the pin $P_1$ and the pin $P_2$ of the relay 302 and the relay 304 in response to the shore power source 162 being connected to the battery charger 160. Accordingly, when the shore power source 162 is connected to the battery charger 160, the shore indicator 306 closes the relay 302 and the relay 304. In other embodiments, the relay 302 and/or the relay 304 are omitted, and the shore indicator 306 supplies electrical energy directly to the wire 214 and/or the input node 172 in response to the shore power source 162 being connected to the battery charger 160.

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the vehicle as shown in the various exemplary embodiments is illustrative only. Additionally, any element disclosed in one embodiment may be incorporated or utilized with any other embodiment disclosed herein. For example, the relays 302 and 304 of the exemplary embodiment shown in at least FIG. 6 may be incorporated in the power system 100 of the exemplary embodiment shown in at least FIG. 2. Although only one example of an element from one embodiment that can be incorporated or utilized in another embodiment has been described above, it should be appreciated that other elements of the various embodiments may be incorporated or utilized with any of the other embodiments disclosed herein.

What is claimed is:

1. A vehicle, comprising:
a chassis;
a plurality of tractive elements coupled to the chassis;
an electrical system, comprising:
an electrical load;
a first energy storage device coupled to the electrical load, the first energy storage device utilizing a first energy storage technology;
a second energy storage device utilizing a second energy storage technology different from the first energy storage technology;
a first switch and a second switch arranged in series between the second energy storage device and the electrical load, such that the second switch is electrically decoupled from the second energy storage device when the first switch is open; and
a relay reconfigurable between an open state and a closed state to control operation of the second switch; and
a controller coupled to the first switch and configured to command the first switch to disconnect the second energy storage device from the electrical load in response to an indication of a power draw from the electrical load.

2. The vehicle of claim 1, further comprising an engine coupled to the chassis and configured to drive the tractive elements to propel the vehicle, wherein the indication of the power draw is an indication that a user is attempting to start the engine.

3. The vehicle of claim 2, wherein the electrical load is a starting motor configured to provide a mechanical energy output to start the engine.

4. The vehicle of claim 3, further comprising an alternator coupled to the engine and configured to be driven by the engine to generate electrical energy, wherein the alternator is coupled to the first energy storage device and selectively coupled to the second energy storage device by the first switch and the second switch.

5. The vehicle of claim 3, further comprising a charger configured to receive electrical energy from an energy source outside the vehicle and provide the electrical energy to the first energy storage device and the second energy storage device, wherein the charger is coupled to the first energy storage device, and wherein the charger is selectively coupled to the second energy storage device by the first switch.

6. The vehicle of claim 1, further comprising a current sensor coupled to the controller and configured to measure an electrical current within the electrical system, wherein the indication of the power draw from the electrical load is a signal from the current sensor indicating that the measured electrical current is exceeding a threshold current.

7. The vehicle of claim 1, further comprising a temperature sensor operatively coupled to the controller and configured to measure a temperature associated with the second energy storage device, wherein the controller is configured to command the first switch to disconnect the second energy storage device from the electrical load in response to an indication from the temperature sensor that the measured temperature is below a threshold temperature.

8. The vehicle of claim 7, wherein the temperature associated with the second energy storage device is an ambient temperature.

9. The vehicle of claim 7, wherein the temperature associated with the second energy storage device is a temperature of the second energy storage device.

10. The vehicle of claim 1, wherein the first energy storage device provides electrical energy at a first voltage, wherein the second energy storage device provides electrical energy at a second voltage, and wherein the second voltage is greater than the first voltage.

11. The vehicle of claim 1, wherein the first energy storage device includes a first battery, and wherein the second energy storage device includes a second battery.

12. The vehicle of claim 11, wherein the first battery is a lead-acid battery, and wherein the second battery is a lithium-ion battery.

13. The vehicle of claim 1, further comprising a charger configured to receive electrical energy from an energy source outside the vehicle and provide the electrical energy to the first energy storage device and the second energy storage device, wherein the relay is configured to change to the closed state in response to an indication that the charger is receiving the electrical energy from the external power source.

14. A vehicle, comprising:
- a chassis;
- a plurality of tractive elements coupled to the chassis;
- an electrical system, comprising:
    - a source of electrical energy;
    - a first energy storage device coupled to the source of the electrical energy, the first energy storage device utilizing a first energy storage technology;
    - a second energy storage device utilizing a second energy storage technology different from the first energy storage technology;
    - a switch selectively coupling the second energy storage device to the source of the electrical energy; and
    - a relay reconfigurable between an open state and a closed state to control operation of the switch;
- a temperature sensor configured to measure a temperature associated with the second energy storage device; and
- a controller coupled to the relay and configured to;
    - command the relay to the open state to open the switch and disconnect the second energy storage device from the source of the electrical energy in response to the measured temperature falling below a threshold temperature while the second energy storage device is charging; and
    - command the relay to remain in the closed state in response to the measured temperature falling below the threshold temperature while the second energy storage device is discharging.

15. The vehicle of claim 14, wherein the source of the electrical energy is a charger configured to receive the electrical energy from an external energy source outside the vehicle.

16. The vehicle of claim 14, further comprising an engine coupled to the chassis and configured to drive the tractive elements to propel the vehicle,
    wherein the source of the electrical energy is an alternator coupled to the engine and configured to be driven by the engine to generate the electrical energy.

17. A power system for a vehicle, comprising:
- an electromagnetic device configured to receive rotational mechanical energy and generate electrical energy;
- a charger configured to receive electrical energy from an external power source outside the vehicle;
- a first battery coupled to the electromagnetic device and the charger such that the electromagnetic device and the charger charge the first battery;
- a second battery;
- a switch selectively coupling the second battery to the electromagnetic device and the charger to charge the second battery; and
- a first relay and a second relay, the second relay selectively coupling the first relay to the switch, wherein the first relay and the second relay are each reconfigurable between an open state and a closed state to control operation of the switch,
    wherein the first battery and the second battery utilize different energy storage technologies.

18. The power system of claim 17, wherein the first relay is coupled to the charger and configured to provide an electrical signal to close the switch in response to an indication that the charger is receiving the electrical energy from the external power source.

19. The power system of claim 18, further comprising a controller configured to control operation of the second relay.

* * * * *